(12) United States Patent
Mathews et al.

(10) Patent No.: US 9,278,634 B2
(45) Date of Patent: Mar. 8, 2016

(54) VEHICLE SEAT

(75) Inventors: Ian Mathews, Cologne (DE); David Cooke, Runcorn (GB); Marc Van-Soolingen, Tegelen (NL); Robin Ndagi-Jimana, Neuss (DE); Wolfgang Pellenz, Meckenheim (DE)

(73) Assignee: Johnson Controls Technology Company, Holland, MI (US)

( * ) Notice: Subject to any disclaimer, the term of this patent is extended or adjusted under 35 U.S.C. 154(b) by 1159 days.

(21) Appl. No.: 12/513,920

(22) PCT Filed: Oct. 30, 2007

(86) PCT No.: PCT/EP2007/009452
§ 371 (c)(1),
(2), (4) Date: Dec. 21, 2009

(87) PCT Pub. No.: WO2008/055610
PCT Pub. Date: May 15, 2008

(65) Prior Publication Data
US 2010/0301649 A1  Dec. 2, 2010

(30) Foreign Application Priority Data

Nov. 9, 2006 (DE) .......................... 10 2006 053 201
Jun. 14, 2007 (DE) .......................... 10 2007 028 052

(51) Int. Cl.
*B60N 2/64* (2006.01)
*B60N 2/44* (2006.01)
*B60N 2/66* (2006.01)
*B60N 2/70* (2006.01)

(52) U.S. Cl.
CPC ................ *B60N 2/449* (2013.01); *B60N 2/643* (2013.01); *B60N 2/66* (2013.01); *B60N 2/7011* (2013.01)

(58) Field of Classification Search
CPC .............................. B60N 2/449; B60N 2/643
USPC ................ 297/284.4, 452.34, 452.35, 452.55
See application file for complete search history.

(56) References Cited

U.S. PATENT DOCUMENTS

| 2,357,825 A | | 9/1944 | Hickman et al. | |
| 2,682,295 A | | 6/1954 | Hickman | |
| 4,711,497 A | * | 12/1987 | Kazaoka et al. | .......... 297/452.54 |
| 5,022,709 A | * | 6/1991 | Marchino | ................ 297/452.24 |

(Continued)

FOREIGN PATENT DOCUMENTS

| DE | 37 07 926 A1 | 9/1988 |
| DE | 4303006 | 8/1994 |

(Continued)

OTHER PUBLICATIONS

International Search Report for application No. PCT/EP2007/009452 mailed Jan. 28, 2008.

(Continued)

*Primary Examiner* — Peter Brown
(74) *Attorney, Agent, or Firm* — Fletcher Yoder, P.C.

(57) ABSTRACT

A motor vehicle seat comprises a seat component and a backrest. The backrest has a shell structure which is provided on an occupant side with an upholstered element. The shell structure has at least one depression for accommodating the upholstered element. The upholstered element is thickened at the location of the at least one depression. The shell structure may have a central part and side wings arranged in an elastically resilient manner on the central part.

18 Claims, 5 Drawing Sheets

(56) References Cited

U.S. PATENT DOCUMENTS

| | | | |
|---|---|---|---|
| 5,076,643 A * | 12/1991 | Colasanti et al. | 297/284.6 |
| 5,219,205 A * | 6/1993 | Fourrey et al. | 297/452.1 |
| 5,505,520 A * | 4/1996 | Frusti et al. | 297/284.4 |
| 5,518,294 A * | 5/1996 | Ligon et al. | 297/284.4 |
| 5,522,645 A * | 6/1996 | Dahlbacka | 297/452.55 |
| 5,938,284 A * | 8/1999 | Coffield | 297/284.9 |
| 6,027,167 A | 2/2000 | Blomdell et al. | |
| 6,027,171 A * | 2/2000 | Partington et al. | 297/452.18 |
| 6,296,308 B1 * | 10/2001 | Cosentino et al. | 297/284.4 |
| 6,755,467 B1 | 6/2004 | Chu | |
| 6,918,633 B2 * | 7/2005 | Forkel et al. | 297/284.4 |
| 7,032,971 B2 * | 4/2006 | Williams | 297/284.4 |
| 7,290,836 B2 * | 11/2007 | Nordstrom et al. | 297/452.36 |
| 7,328,950 B2 * | 2/2008 | McMillen et al. | 297/284.4 |
| 7,360,836 B2 * | 4/2008 | Schwarzbich et al. | 297/284.4 |
| 7,445,292 B2 * | 11/2008 | Moule | 297/452.25 |
| 2005/0275263 A1 | 12/2005 | Norman et al. | |

FOREIGN PATENT DOCUMENTS

| | | |
|---|---|---|
| DE | 4303006 A1 | 8/1994 |
| DE | 4401665 | 7/1995 |
| DE | 19827563 | 12/1999 |
| DE | 10115243 | 10/2002 |
| DE | 101 44 078 A1 | 4/2003 |
| DE | 69724103 T2 | 5/2004 |
| DE | 10328044 | 2/2005 |
| DE | 60306496 | 7/2007 |
| EP | 1 167 116 A1 | 1/2002 |
| EP | 1 483 134 B1 | 6/2006 |
| FR | 2777968 | 10/1999 |
| WO | 2005047057 | 5/2005 |
| WO | 2006119809 | 11/2006 |
| WO | 2006119809 A1 | 11/2006 |

OTHER PUBLICATIONS

Written Opinion for application No. PCT/EP2007/009452 mailed Jan. 28, 2008.

German Examination Report issued Feb. 8, 2012.

* cited by examiner

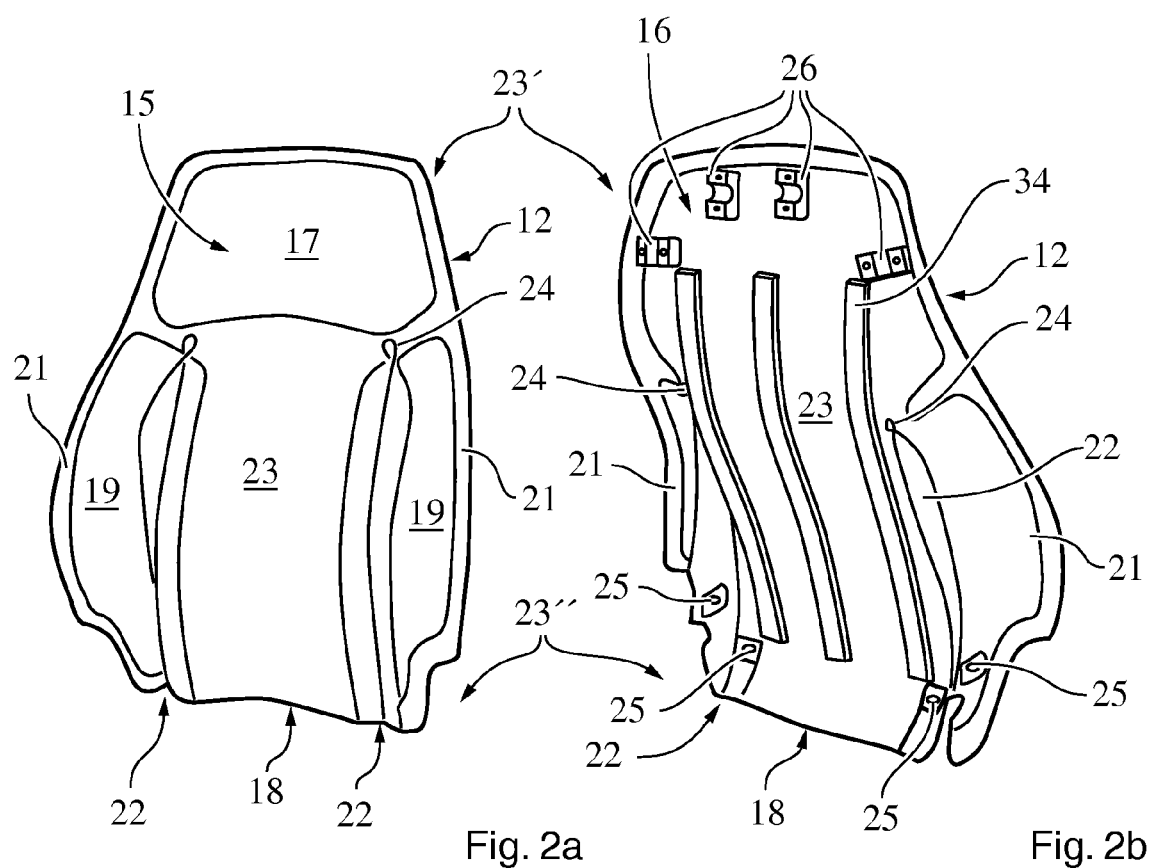

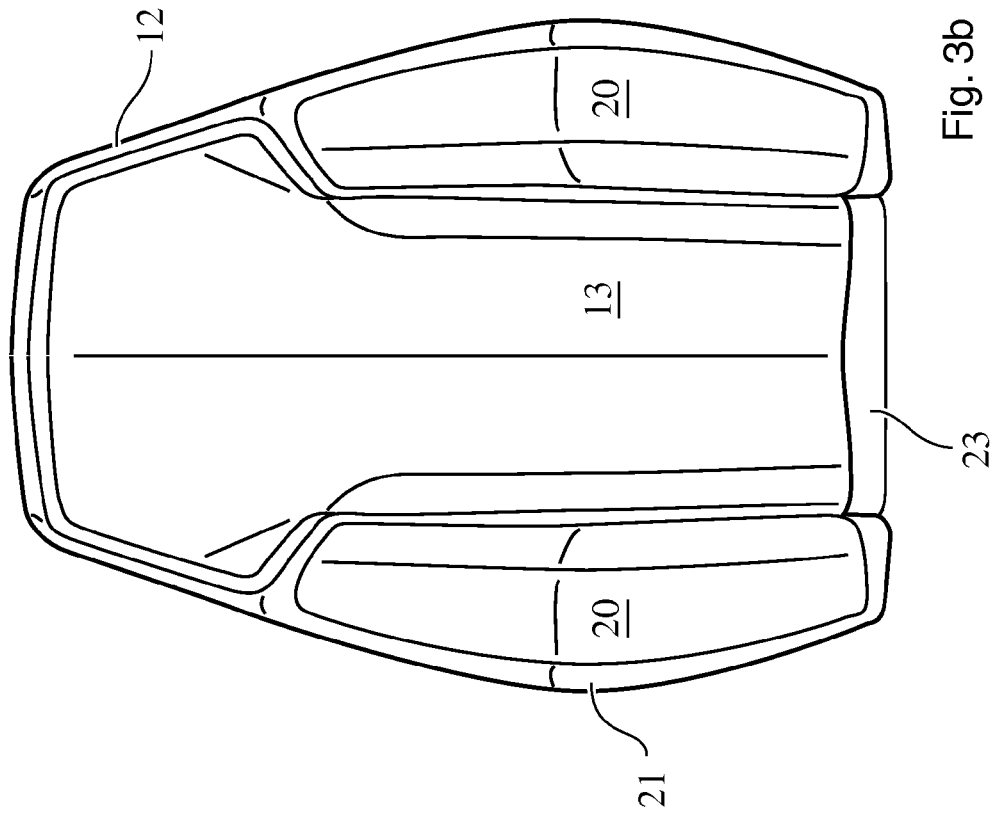
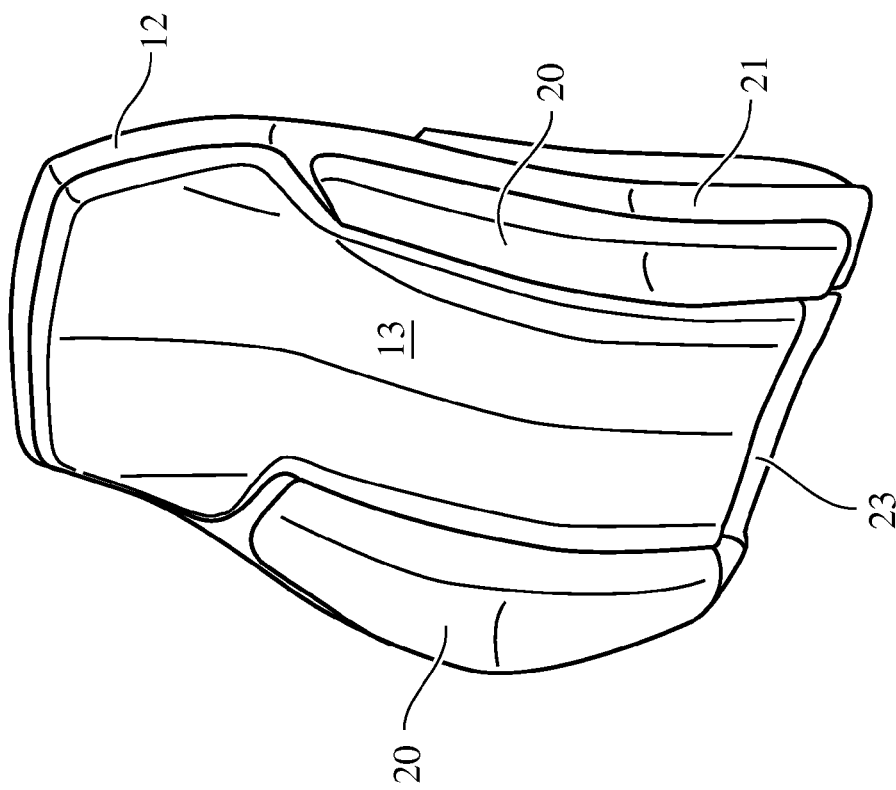

VEHICLE SEAT

CROSS REFERENCE TO RELATED APPLICATIONS

This application claims priority from and the benefit of PCT Application No. PCT/EP2007/009452, filed on Oct. 30, 2007; German Patent No. DE 10 2006 053 201.5, filed on Nov. 9, 2006; and German Patent DE 10 2007 028 052.3, filed on Jun. 14, 2007; all entitled "Vehicle Seat", which are herein incorporated by reference.

BACKGROUND

The invention relates to a vehicle seat, in particular a motor vehicle seat, with a seat component and a backrest, the backrest having a shell structure which is provided on the occupant side with an upholstered element.

Such vehicle seats are known from the international patent application PCT/EP06/001191. This patent application is, therefore, used as a reference and thus applies as part of the disclosure. The motor vehicle seats disclosed therein are characterized by a small overall depth. Structures for vehicle seats are, for example, known from DE 43 03 006 as well as DE 697 24 103 T2.

SUMMARY

The object of the invention is to provide a vehicle seat with a backrest with a particularly small overall depth, without the comfort relative to conventional vehicle seats being impaired and/or to increase the seating comfort of a vehicle seat with a small overall depth.

The object is achieved by a vehicle seat, in particular a motor vehicle seat, with a seat component and a backrest, the backrest having a shell structure which is provided on the occupant side with an upholstered element and the shell structure having at least one depression for accommodating the upholstered element which is thickened there.

According to a further object of the present invention or according to a preferred embodiment, the shell structure of the motor vehicle seat comprises a central part and side wings which are arranged in an elastically resilient manner on the shell structure.

The motor vehicle seats according to the invention are characterized by a high degree of comfort with a small overall depth. As a result of the small overall depth, the knee clearance for occupants of the vehicle seats arranged at the rear and the use of the vehicle interior is generally improved. Moreover, the motor vehicle seats according to the invention are relatively lightweight. The shell structure may be adapted to the requirements of the respective motor vehicle manufacturer relatively easily, whereby a customization of the respective motor vehicle seat is possible.

The motor vehicle seat according to the invention has a seat component and a backrest. Whilst the seat component may be made in a conventional manner, the backrest comprises a shell structure which may be made from any suitable material. Preferably, the shell structure consists at least partially of plastics. With regard to the seat component and the shell structure, reference is also made to PCT/EP06/001191. This patent application is, therefore, used as a reference and thus applies as part of the disclosure. This seat structure may comprise a central part which is arranged in the region around the spinal column of the occupant and side wings, which are arranged in the lateral edge region of the back. The motor vehicle seat may be arranged at any point within the motor vehicle interior.

In a first embodiment according to the invention, the shell structure comprises at least one depression for accommodating thickened upholstered elements. By these upholstered elements, the seating comfort of the motor vehicle seat according to the invention is increased. As the upholstered elements are arranged in depressions, the overall depth of the backrest is increased only slightly, if at all. As a result of the depressions, moreover, the rigidity of the shell structure is increased. Preferably, the depressions and accordingly the thickened upholstered elements are arranged in the upper region of the central part of the shell structure. Moreover, preferably, the depressions and accordingly the thickened upholstered elements are arranged in the region of the side wings, so as to improve in turn the seating comfort and the lateral support of the occupants.

According to a further or preferred embodiment of the present invention, the shell structure of the motor vehicle seat comprises a central part and side wings, which are arranged in an elastically resilient manner on the shell structure. As a result, the seating comfort of the occupants of the seat is additionally increased. "Elastically resilient" within the meaning of the invention means that the side wings of the backrest contour yield when occupying the motor vehicle seat, but provide a tangible resistance at the same time. When the motor vehicle seat is vacated, the side wings again regain their shape. The side wings deform with changing load conditions, for example during travel.

Preferably, between the central part and the side wing, a slot is arranged. Particularly preferably, the slot comprises an upper region in which means are located for reducing the stress concentration, in order to prevent the shell structure in this region from tearing under load. Such means are, for example, preferably arcuate rounded portions or other shapes which have no sharp edges.

Preferably, the central part comprises reinforcing means, for example reinforcing ribs, which are particularly preferably arranged parallel to the longitudinal axis of the shell structure.

Preferably, the vehicle seat according to the invention additionally comprises a backrest structure, for example made of metal, in order to provide the vehicle seat with the necessary rigidity. Particularly preferably, the central part of the shell structure in its upper region is connected by semi-flexible bearings to a backrest structure. These bearings connect the shell structure fixedly to the backrest structure but have, for example, a certain resilience as a result of the choice of material, for example a semi-rigid plastic. As a result, the shell structure may move relative to the backrest structure, so that the shell structure may be adapted to a certain extent to the shape of the back of the vehicle occupant, which has a positive effect on the seating comfort.

Moreover, the central part of the shell structure preferably comprises on its lower region a bearing arrangement which, when occupying the seat, allows a relative movement between the central part and the backrest structure. As a result of this preferred embodiment, the lower part of the central part of the shell structure may also be adapted to the back of the seat occupant.

Preferably, the bearing arrangement comprises a rotary lever arrangement, preferably a rotary lever being connected to the central part of the shell structure and a lever being connected rotatably to the backrest structure of the vehicle seat. The two levers are connected to one another via a pivot pin.

A further preferred embodiment consists of a rotary lever, which is connected at its one end rotatably to the backrest structure and at its other end cooperates with a linear guide which is arranged on the central part.

Particularly preferably, the bearing arrangement is preferably pre-tensioned with a spring means, so that, for example, the convexity of the central part in the lumbar region may be specifically adjusted by altering, for example, the spring tensioning. Particularly preferably, the pre-tensioning of the spring means is adjusted by a tensioning device.

DRAWINGS

The inventions are explained hereinafter with reference to FIGS. 1-6. These explanations are merely given by way of example and do not limit the general inventive idea. The explanations apply to both subjects of the invention equally.

FIG. 2 shows the shell structure in two views.

FIG. 3 shows the shell structure according to FIG. 2 with upholstered elements.

DETAILED DESCRIPTION

Figure 1:
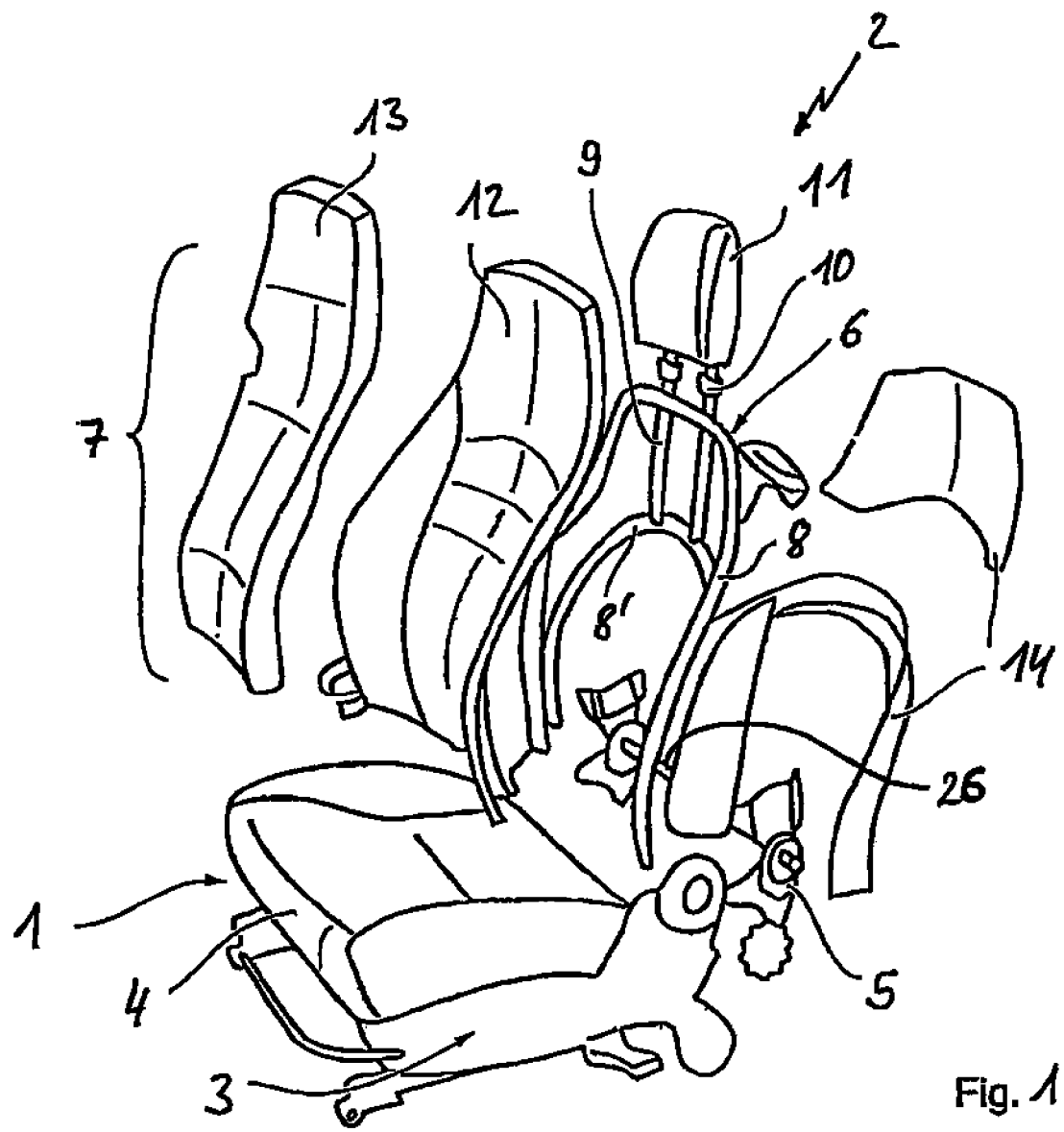
FIG. 1 shows an embodiment of the motor vehicle seat according to the invention.

The figures represent by way of example and schematically various embodiments of the invention. The backrest shown in FIG. 1 corresponds in its principal design to the embodiment disclosed in PCT/EP06/001191.

The seat component 1 of the vehicle seat 2 consists in the conventional manner of a metal structure 3 welded from sheet steel and a relatively solid cushion 4 made of expanded polyurethane directly positioned thereon. The backrest inclination adjusters 5 arranged at the rear region of the metal structure 3 accommodate the protruding ends of a U-shaped frame part 6 of the backrest 7 in a manner which permits angular adjustment. The frame part 6 is constructed from two curved tubular parts 8, 8' arranged spaced apart from one another, the downwardly protruding ends thereof being connected to the backrest inclination adjusters 5. In the upper region, the tubular parts 8, 8' are connected to one another by two vertical tubular uprights 9, which receive the retaining rods 10 of a conventional headrest 11. The frame part 6 on the occupant side is provided with an elastically deformable shell structure 12 consisting of plastics and molded to the contour of the body, and a thin-walled upholstered element 13. Covers 14 clad the frame part 6 to the rear. The shape of the shell structure 12 may be established by the respective vehicle manufacturer, whereby a possibility for customization is possible relative to other vehicle manufacturers.

FIGS. 2a and 2b show the front face 15 and/or the rear face 16 of the shell structure 12 facing the occupant. Said shell structure has at the front side an upper depression 17 for accommodating the upholstered element 13 which is thickened there, extending as far as the lower edge 18 of the shell structure 12 (see FIG. 3a, b) as well as lateral depressions 19 for receiving specific lateral upholstered elements 20. The associated side wings 21 of the shell structure 12, are partially separated from the central part 23 of the shell structure 12 via approximately vertically extending slots 22 extending from the lower edge as far as the upper third of the shell structure 12, and are elastically resilient relative to the central part 23.

For reducing the stress concentration, the slots 22 are provided at their upper end with a curved widened portion 24. On the rear face of the central part reinforcing ribs 34 are arranged.

The side wings 21 and the central part 23 are provided on the rear face in the region of the lower edge 18 with fastening points 25, 25' for attaching to the frame part 6 as well as a transverse tube 26 extending between the backrest inclination adjusters 5 (see FIG. 1). At the upper end 23' of the central part of the shell structure 12, further semi-flexible shell-like bearings 26 are provided at the rear for encompassing the tubular part 8 of the frame structure 6 in a rotationally mobile manner.

Figure 4:
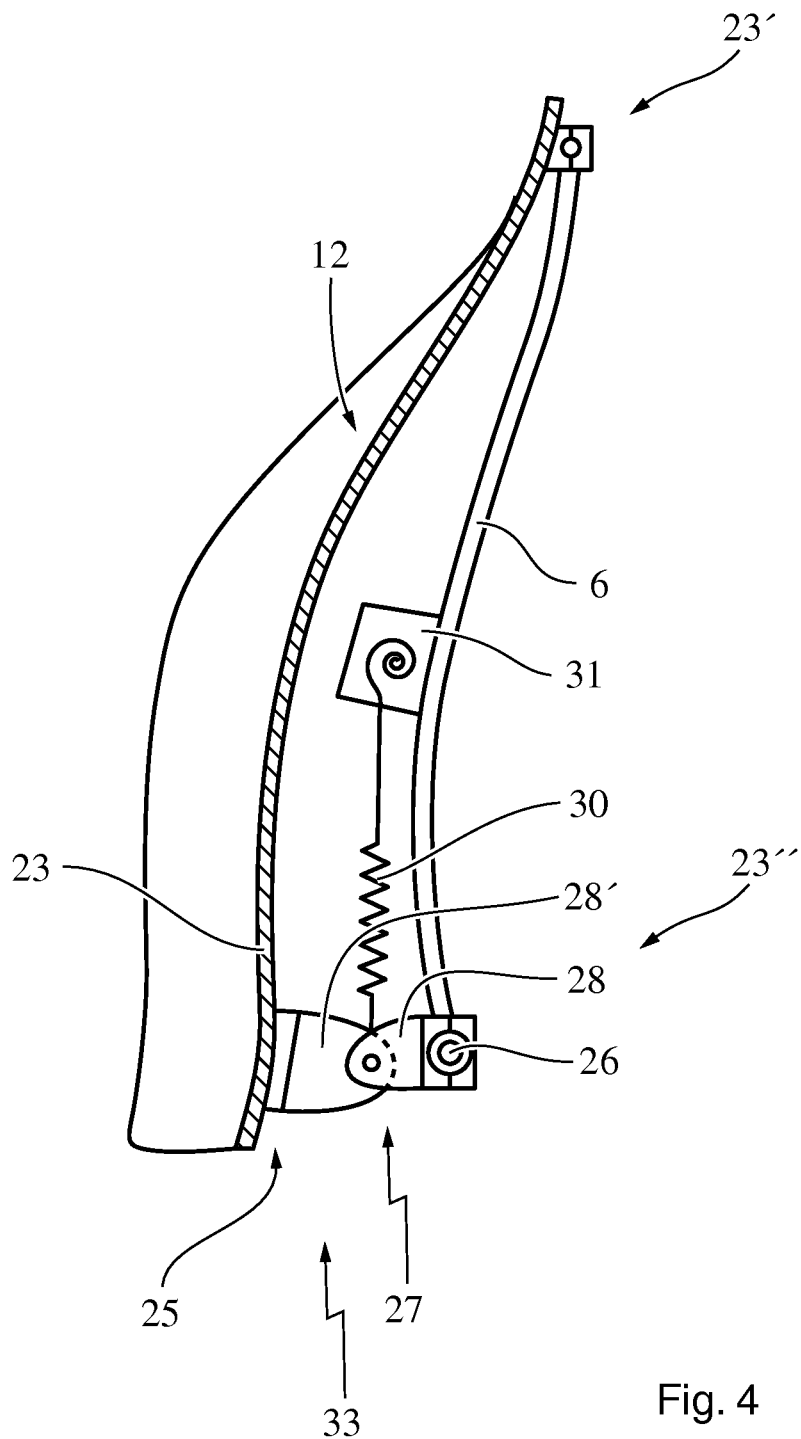
FIG. 4 shows the lower bearing arrangement with spring means.

The connection between the fastening points 25 associated with the central part 23 and the frame part 6, as is visible from FIG. 4, may advantageously take place via a rotary lever arrangement 27, which comprises a first rotary lever 28 mounted pivotably on the transverse tube 26 and a second second rotary lever 28' fixed rigidly to the shell structure 12 via the fastening point 25. The rotary levers 28, 28' are connected to one another pivotably about a pivot pin 29 extending transversely to the seating direction and compensate for the vertical extension of the shell structure 12 during the spring deflection of the central part 23. By spring means 30 acting on the rotary lever arrangement 27, extending upwardly, for example from the pivot pin 29, the convexity of the central part 23 in the lumbar region may be influenced and even specifically adjusted by a device 31 for altering the spring tensioning. Moreover, alterations to the characteristics of the backrest by changes in temperature when the seat is occupied, may be compensated.

Figure 5:
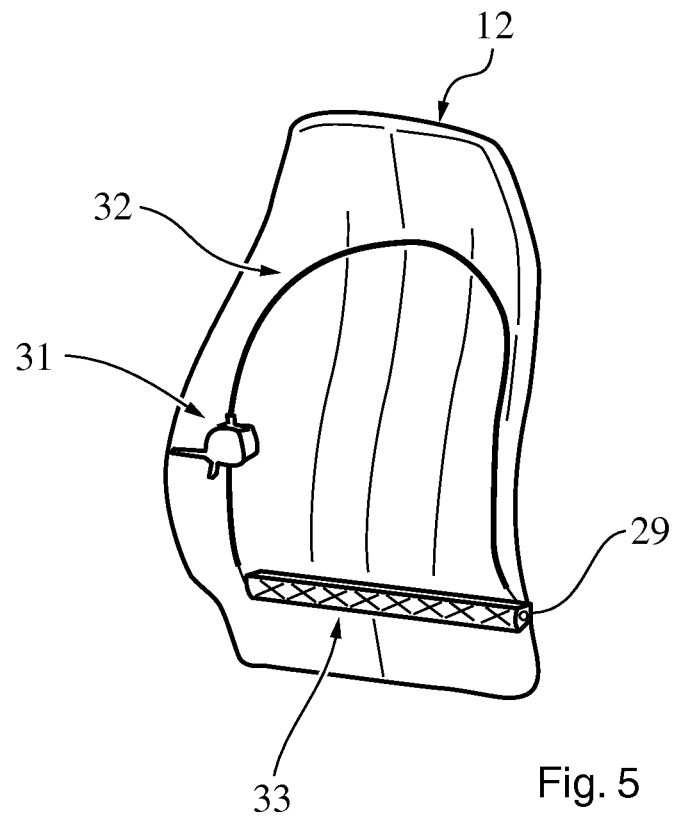
FIG. 5 shows a further embodiment of the bearing arrangement with spring means.

FIG. 5 shows a further embodiment of the lower bearing arrangement 33. When the seat is occupied, the bearing arrangement 33 rotates about a pivot pin 29 and generates a deflection of the Bowden cable 32, the core 36 thereof being connected on both sides to the bearing arrangement 33. The degree of rotation depends on the pre-tensioning of the Bowden cable as well as the degree of loading.

Figure 6:
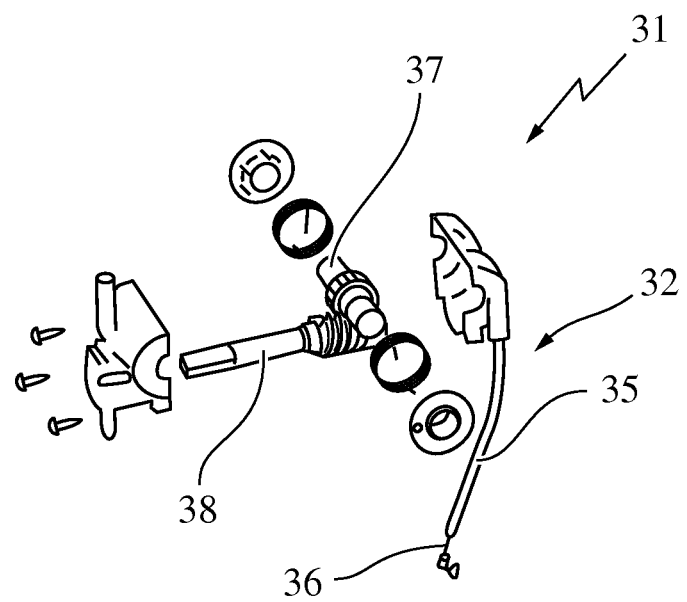
FIG. 6 shows a modification of the spring tensioning.

The pre-tensioning of the Bowden cable, which in the present example represents the spring means, takes place by the means 31 which are shown in FIG. 6. The core 35 of the Bowden cable is inserted at two points into the device 31 and connected to the roller 37. The sleeve 35 of the Bowden cable 32 is supported at two points on the means 31. By rotating the roller, the Bowden cable is tensioned and/or relaxed. The roller 37 is driven by the drive shaft 38 which may be operated manually or by motor.

The invention claimed is:

1. A vehicle seat comprising:
a seat component; and
a backrest comprising a shell structure, wherein the shell structure is elastically deformable, the shell structure is formed at least partially from plastic, and the shell structure is molded to correspond to a contour of a body;
wherein the shell structure comprises a central part and side wings, the side wings are arranged on the shell structure in an elastically resilient manner, the side wings are configured to yield and to provide resistance while the vehicle seat is occupied, the side wings are configured to regain an initial shape when the vehicle seat is vacated, and the side wings are configured to deform in response to changing load conditions;
wherein the side wings are partially separated from the central part by approximately vertically extending slots extending from a lower edge of the shell structure as far as an upper third of the shell structure, a widened arcuate rounded portion is formed at an upper end of each approximately vertically extending slot to reduce stress concentration, the backrest comprises fastening points on a rear face of the side wings proximate to the lower edge of the shell structure, and the fastening points are configured to attach the side wings to a frame part and to a transverse tube extending between backrest inclination adjusters of the vehicle seat.

2. The vehicle seat as claimed in claim 1, wherein the central part of the shell structure in an upper region thereof is connected by semi-flexible bearings to a backrest structure.

3. The vehicle seat as claimed in claim 2, wherein the central part of the shell structure in a lower region thereof is movably mounted by a lower bearing arrangement on the backrest structure.

4. The vehicle seat as claimed in claim 3, wherein the bearing arrangement comprises a rotary lever arrangement.

5. The vehicle seat as claimed in claim 3, wherein the bearing arrangement is pre-tensioned by a spring.

6. The vehicle seat as claimed in claim 5, wherein the pre-tensioning of the spring is adjustable by a tensioning device.

7. The vehicle seat of claim 1, wherein the backrest comprises an upholstered element disposed on an occupant side of the shell structure.

8. The vehicle seat of claim 7, wherein the shell structure includes at least one depression configured to accommodate the upholstered element.

9. The vehicle seat of claim 8, wherein the upholstered element is thickened at a location of the at least one depression.

10. The vehicle seat of claim 1, wherein the backrest comprises ribs formed on a back side of the shell structure and extending substantially parallel to the approximately vertically extending slots.

11. The vehicle seat as claimed in claim 10, wherein the ribs are configured to reinforce the central part of the shell structure.

12. A vehicle seat comprising:
a seat component; and
a backrest comprising a shell structure;
wherein the shell structure comprises a central part and side wings, the side wings are arranged on the shell structure in an elastically resilient manner, the side wings are partially separated from the central part by approximately vertically extending slots extending from a lower edge of the shell structure as far as an upper third of the shell structure, a widened arcuate rounded portion is formed at an upper end of each approximately vertically extending slot to reduce stress concentration, the backrest comprises fastening points on a rear face of the side wings proximate to the lower edge of the shell structure, and the fastening points are configured to attach the side wings to a frame part and to a transverse tube extending between backrest inclination adjusters of the vehicle seat.

13. The vehicle seat of claim 12, wherein the backrest comprises an upholstered element disposed on an occupant side of the shell structure.

14. The vehicle seat of claim 13, wherein the shell structure includes at least one depression configured to accommodate the upholstered element.

15. The vehicle seat of claim 14, wherein the upholstered element is thickened at a location of the at least one depression.

16. The vehicle seat of claim 8, wherein the backrest comprises ribs formed on a back side of the shell structure and extending substantially parallel to the approximately vertically extending slots.

17. The vehicle seat of claim 16, wherein the ribs are configured to reinforce the central part of the shell structure.

18. The vehicle seat of claim 12, wherein the central part of the shell structure in an upper region thereof is connected by semi-flexible bearings to a backrest structure.

* * * * *